United States Patent
Mentzer et al.

(10) Patent No.: US 7,539,880 B2
(45) Date of Patent: May 26, 2009

(54) SYSTEM AND METHOD FOR MANAGING POWER CONSUMPTION

(75) Inventors: Ray A. Mentzer, Corvallis, OR (US); Jeffrey S. Beck, Philomath, OR (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 456 days.

(21) Appl. No.: 11/223,343

(22) Filed: Sep. 9, 2005

(65) Prior Publication Data

US 2007/0061599 A1    Mar. 15, 2007

(51) Int. Cl.
*G06F 1/32* (2006.01)
(52) U.S. Cl. .............. 713/300; 713/310; 713/320; 713/321; 713/322; 713/323; 713/324; 713/330; 713/340
(58) Field of Classification Search .......... 713/300, 713/310, 320–324, 330, 340
See application file for complete search history.

(56) References Cited

U.S. PATENT DOCUMENTS

| | | | |
|---|---|---|---|
| 6,694,492 B1* | 2/2004 | Shakkarwar | 716/2 |
| 2003/0158609 A1* | 8/2003 | Chiu | 700/22 |
| 2005/0040810 A1* | 2/2005 | Poirier et al. | 324/158.1 |

* cited by examiner

*Primary Examiner*—Abdelmoniem Elamin

(57) ABSTRACT

An electronic circuit having built-in self testing capabilities for optimizing power consumption. Typically, the electronic circuit includes a component circuit that operates at some known or unknown optimal operating power level. Further, the electronic circuit includes a power supply coupled to the component circuit such that the power supply provides power to the component circuit. Further yet, the electronic circuit includes a test circuit coupled to the component circuit and coupled to the power supply. The test circuit is operable to monitor the power supplied to the component circuit and operable to control the power supply. In an iterative manner, the test circuit reduces the power supplied to the component circuit until the power supplied to the component circuit is operating at the optimal operating power level.

18 Claims, 3 Drawing Sheets of the Poirier Reference

SYSTEM AND METHOD FOR MANAGING POWER CONSUMPTION

BACKGROUND OF THE INVENTION

Integrated Circuits (ICs) and Electronic Circuit Boards (ECBs) are prevalent in today's electronics as they are becoming more functional and easier and cheaper to manufacture. Portable devices employing ICs and ECBs are capable of performing many functions based solely on power supplied by a battery. However, conventional devices are often limited by the number and capacity of these functions by the amount of battery power available. As such, electronic components' power consumption is a key factor considered when designing electronic devices.

Typically, electronic circuits in these devices are designed with a "worst-case scenario" in mind. That is, the amount of power (i.e., current and/or voltage) supplied to each component in the device is set to a level that assures correct operation. If is often the case, however, that the worst-case scenario set at a safe minimum power level may be wasteful and inappropriate for some situations and components. Thus, power is wasted because the power supply is set to a specific worst-case level in order to ensure proper operation of all components in the device when there may be additional "head-room" for lowering the supplied power levels on a component by component basis.

Furthermore, the performance of components will change with respect to other variables, such as component temperature, heat transfer rates, and the amount of available power remaining in the power supply (typically a power-limited battery). Such devices typically use a temporary power cell, such as, a battery (e.g. alkaline) or rechargeable battery (e.g. Lithium, Ni-MH, etc.). The importance of the rate at which power is consumed by a device, such as a mobile telephone, a digital camera, or digital video camera, is a balancing act between providing functionality and preserving battery life.

In most conventional battery-operated devices, some type of power efficiency system is employed, such as, programmatic features that places the device into "sleep mode" when it isn't utilized for a given period of time. Various other power conservation schemes have also been implemented but are typically associated with switching between modes of operation, e.g., telephone mode to a camera mode. All of the various conventional power conservation schemes, however, remain associated with a worst-case scenario minimum performance level.

Using worst-case scenario design parameters, every conventional system is designed to deliver a specified amount of power to system components that guarantees performance in worst case conditions. Due to the manufacturing variance of electronics, temperature effects, and battery capacity, this type of power management results in the delivery of power to the system components that is more than needed for optimal performance. Furthermore, this type of power management cannot react to a real-time change in operating variables, such as temperature and battery life remaining.

SUMMARY OF THE INVENTION

An embodiment of the invention is directed to an electronic circuit having built-in self testing capabilities for optimizing power consumption. Typically, the electronic circuit includes a component circuit that operates at some known or unknown optimal operating power level. Further, the electronic circuit includes a power supply coupled to the component circuit such that the power supply provides power to the component circuit. Further yet, the electronic circuit includes a test circuit coupled to the component circuit and coupled to the power supply. The test circuit is operable to monitor the power supplied to the component circuit and operable to control the power supply. In an iterative manner, the test circuit reduces the power supplied to the component circuit until the power supplied to the component circuit is operating at the optimal operating power level.

With such an electronic circuit, power supplied to one or more electronic components in an electronic device may be optimized on a component by component basis. Furthermore, certain operating modes and events may be optimized and anticipated to further conserve power in an electronic device. In one method of the invention, the test circuit monitors the component circuit for failure in an iterative manner. That is, in a cyclical manner, the test circuit may reduce the amount of power supplied to the component circuit until the power supplied to the component circuit is just enough to ensure proper operation as monitored by the test circuit. Once optimal power levels are known, the power levels may be set for future operating conditions, modes and circumstances.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

Figure 1:
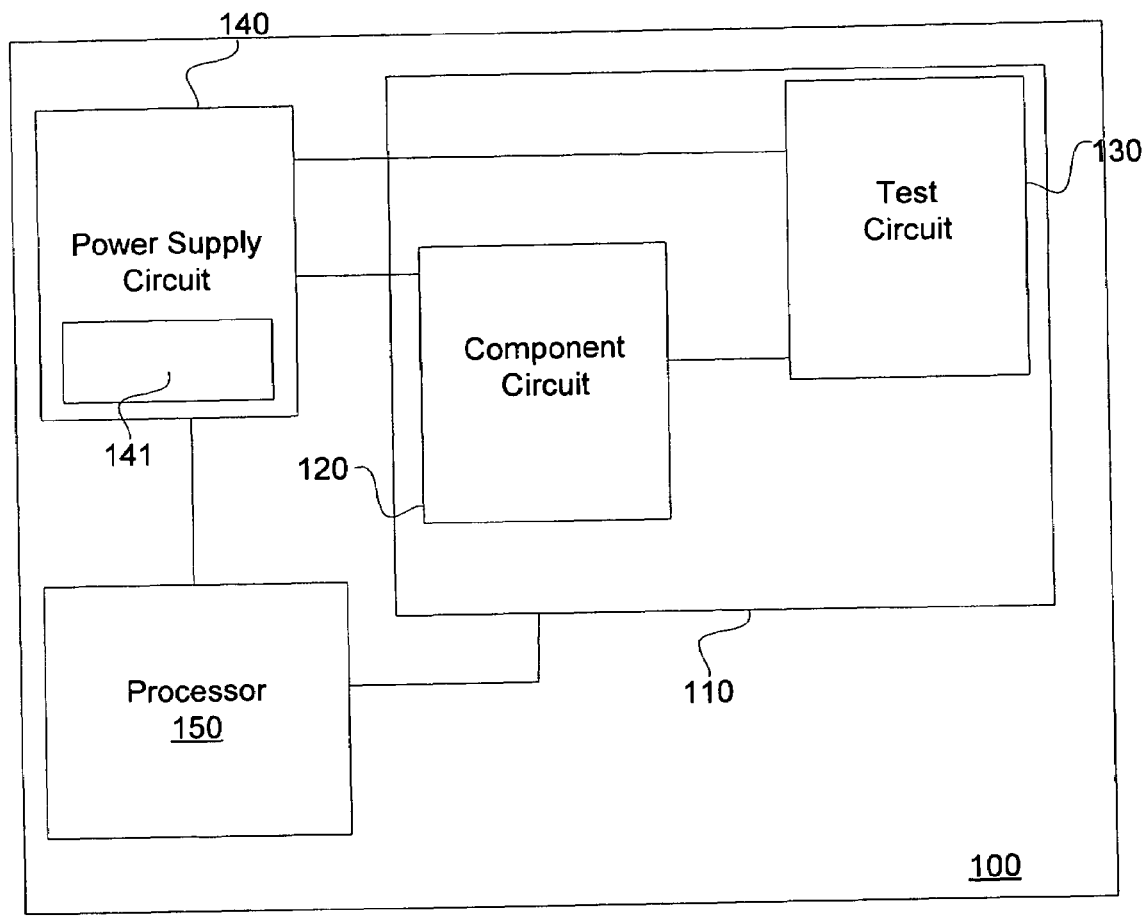
FIG. 1 is a functional block diagram generally illustrating an electronic device having power conservation capabilities according to an embodiment of the invention.

FIG. 1 is a functional block diagram generally illustrating an electronic device having power conservation capabilities according to an embodiment of the invention. The electronic device 100 is generally representative of an operating environment that may be implemented in any number of electronic systems including handheld devices, digital cameras, digital video cameras, and the like. Although described in some examples to follow in the context of a digital imaging device, it is appreciated that implementations of the invention may have equal applicability in other areas, such as cellular phone and personal digital assistants (PDAs), laptop computing devices, and the like. In other embodiments, the operating environment may be implemented in any device requiring the management of power consumption, including but not limited to non-mobile devices, such as, personal computers and other non-mobile electronic devices.

In this example, the electronic device 100 includes an electronic circuit 110 that further includes a component circuit 120 coupled to a test circuit 130 and a power supply circuit 140. These elements and their relationships between each other are detailed in the following paragraphs. The electronic device 100 may further include additional components (now shown) that are typically associated with electronic circuit design, but need not be discussed in further detail herein. Furthermore, each of these elements may comprise one or more integrated circuits either individually or in any combination with each other or other additional components.

The component circuit 120 typically comprises a circuit utilized by the electronic device 100 for performance of system functionality. For example, in a digital imaging device, the component circuit 120 may be an image sensor or other such device that possesses non-linear power requirements. In such a digital imaging device, other such examples include a ringtone generator, a photocell, a control circuit, a processing circuit, a memory circuit, a display device, a lighting device, a recording device, etc.

In this example, the component circuit may further include a signal converter 121 in the form of a analog-to-digital converter that may be a critical point in a signal processing path from a minimum power perspective. As such. A test circuit 130 may also be coupled to the component circuit 120 and operable to monitor the operating and performance characteristics of the component circuit 120. The test circuit 130 is also coupled to the power supply circuit such that the test circuit 130 may control the amount of power supplied to the component circuit 120 based on the monitoring of the operating and performance characteristics of the component circuit 120. This will be discussed in greater detail below.

The power supply circuit 140 may be any suitable circuit capable of delivering a variable amount of power to one or more electronic circuits including the component circuit 120 and test circuit 130. In one embodiment, the power supply circuit 140 includes a plurality of current sources 141 that can be controlled to increase or reduce power delivered to components of the electronic circuit 110. In such an embodiment, the current sources 141 may be configured as current mirrors in a cascading configuration, wherein the amount of current supplied to the component circuit 120 being monitored is varied according to the parameters of the test circuit's monitoring of the performance level. In another embodiment (not shown), the amount of voltage supplied to the component circuit 120 being monitored is varied according to the parameters of the test circuit's monitoring of the performance level.

The electronic device 100 may further include a processor 150 for implementing programmatic instructions for realizing various power control scenarios at various operating conditions for the electronic circuit 110. The processor 150 is coupled to the power supply circuit 140 and to the electronic circuit 110 such that operational control of each may be implemented through computer-readable instructions stored in a volatile or non-volatile memory (not shown). Alternatively, the electronic device may only include firmware (not shown) having a hard-set of executable instructions for realizing a power conservation scheme in the electronic device. In any case, the power supply circuit 140 is typically coupled to a control circuit (i.e., processor 150 or firmware) that may programmatically control the power supply circuit 140 and other component features of the electronic device 100.

The test circuit 130 typically comprises a testing circuit that implements self-test programming instructions to implement a power conservation scheme within electronic circuit 110. In the embodiment detailed in FIG. 1, test circuit 130 and component circuit 120 are implemented as separate distinct circuits. In another embodiment (not shown), the component circuit 120 may be configured to include test circuit 130 which is typically referred to as a built-in-self-test (BIST) circuit. In yet another embodiment, the self-test programming instructions are stored within memory (not shown) resident within test circuit 130. In another embodiment, the self-test programming instructions stored within a memory device not resident within test circuit 130, such as a memory device (not shown) associated with the processor 150, or some other memory device (not shown) located elsewhere within the electronic device 100. Any memory device (not shown) may be implemented as on-board RAM, ROM, static memory, dynamic memory, gate-type magnetic bubble memory. Alternatively, the processor 150 and the memory device (also not shown) could collectively reside in an application specific IC (ASIC). In another embodiment, the memory device (not shown) may be composed of firmware or flash memory.

In any embodiment described herein, the executable instructions may implement a self test for realizing a power conservation scheme, which may be implemented as method 200 (see FIG. 2, below) as describe in the present invention. In exemplary operation, test circuit 130 may receive performance data from the component circuit 120 and provide instructions to the component circuit 120 based on the circuit performance data and the self test programming instructions. For example, the test circuit 130 may monitor one or more analog-to-digital converters (ADC) (typically, there are 4 10-bit ADCs in an imaging component of a digital imaging device). As such, with enough power supplied to the ADCs, operation will be smooth and normal. That is, each digital signal (i.e., a code as referred to herein) converted from an analog signal from a previous point in the signal chain will represent a portion of a digital image captured by an analog imaging device such as a CMOS array and the like. Thus, normal operation will yield no distortion in the codes (i.e., codes do not fluctuate level from one to the next very much indicating smooth transitions from one color to the next in an image). Furthermore, there will be no missing codes if the power supplied to the electronic component 120 is sufficient.

However, as the power supplied to the component circuit 120 is reduced enough to affect the operation of the component circuit 120, the first place that failure may occur is typically at the ADCs 121. Thus, distortion from code to code or missing codes will be apparent. Distortion and missing codes may be prevented by maintaining a minimum power level for the component circuit, but the minimum power level for any given component circuit may vary based on operating conditions, other components therein and manufacturing variances. As a result, the test circuit 140 monitors the component circuit (i.e., monitors the codes output from the ADCs 121 in this example) for failure in an iterative manner. That is, in a cyclical manner, the test circuit may reduce the amount of power supplied to the component circuit 120 until the power supplied to the component circuit is just enough to ensure proper operation as monitored by the test circuit 140. This process is detailed further with respect to the method illustrated by FIG. 2.

Figure 2:
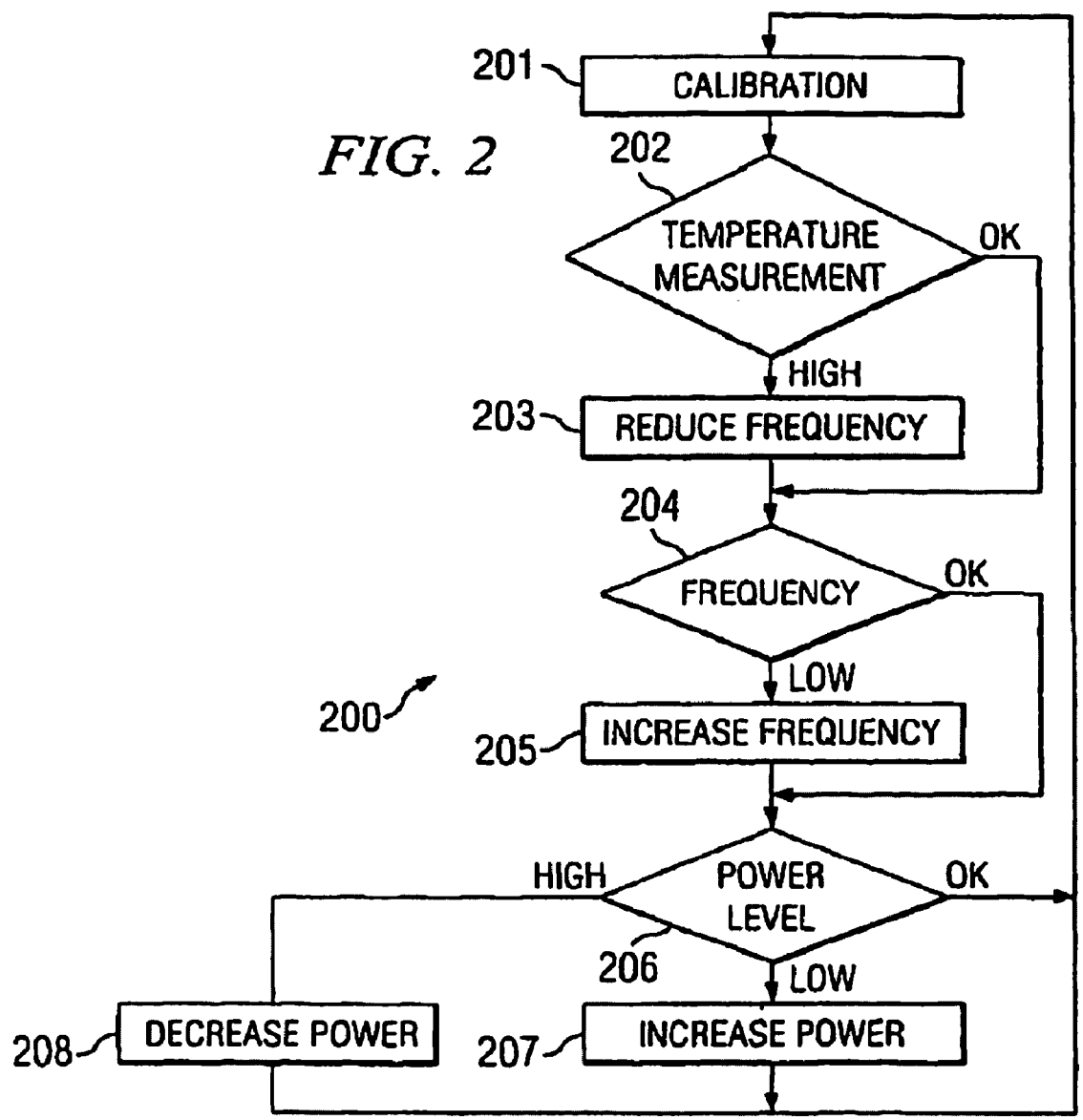
FIG. 2 is an operational flow diagram generally illustrating a process for managing power delivery in an electronic device, in accordance with an embodiment of the present invention.

FIG. 2 is an operational flow diagram generally illustrating a method 200 for providing power conservation in an electronic device 100. In one embodiment, method 200 is implemented within the exemplary operating environment of the electronic device 100 of FIG. 1. As discussed above, one or more steps of the method 200 may be embodied in a computer-readable medium containing computer-executable instructions such that a series of steps are implemented when executed on a computing device. In some implementations, certain steps of the method 200 are combined, performed simultaneously or in a different order, without deviating from the objective of the method 200.

The method 200 begins at step 210 where an initial power level may already be set for component operation. If a trigger event occurs (e.g., system power-up, system mode switch, battery low, etc.) the self-test may be triggered and the method 200 begins. At step 220, a test of the performance of a component circuit (such as component circuit 120 of FIG. 1) is executed. Executing the test typically includes receiving performance data (such as 10-bit codes from the ADCs 121 of FIG. 1) and analyzing the received performance data. The received performance data may or may not meet a minimum performance requirement as will be determined in the decision step below.

At decision step 230, the test circuit 140 determines whether the component circuit 121 is performing at least at a minimum performance level based on the analysis of the received performance data. The minimum performance level will vary from component to component and will depend on the type of component being monitored. Thus, in the example used herein, distorted or missing codes from the ADCs 121 are an indication of a less-than-acceptable performance level. Other manners of determining a minimum performance level of a component are known in the art but not discussed herein for brevity.

Furthermore, the minimum performance level may also depend on a mode of operation of the component circuit 120 and/or the electronic device 100. If a mode is set to best performance level, the minimum performance level for the decision step 220 may be set to a high standard whereas, if battery power is running low and power needs to be conserved, the minimum performance level may truly be a minimum. Additionally, different modes of device operation may be associated with different operating levels required. Such modes may include picture taking mode (which may further include an image quality level), picture viewing mode, phone mode, low-battery mode, etc. For example, a digital imaging device taking a picture may require a higher standard that a digital imaging device viewing a picture. Further yet, other anticipatory modes may affect the analysis. For example, a ring-tone event in a cell phone having a digital imaging device causing power fluctuations, may alter the minimum operating requirements.

Therefore, if the determination indicates that the component circuit 120 is operating to at least a minimum performance level based on the analysis, the method 200 advances to step 240 where the power supplied by the power supply circuit 140 is reduced by a fixed amount. The method then loops back to execute the self test again at step 220. This is an iterative process such that the loop back will continue between steps 220 and 240, while reducing the amount of power supplied to the electronic component each time the test is passed at step 230 until the self test fails. If the self test indicates that the component circuit 120 falls below the minimum performance level based on the analysis, the method 200 advances to step 250.

At step 250, the most-recent power level that, in fact, did provide for passing the self-test is restored. That is, through several iterations of reducing the power in small increments, the power level that was the set power level just before the one associated with the failed test becomes the power level identified as the minimum operating level for the component circuit, at current operating conditions and operating mode. Thus, the iterative process "zeroes in" on the power supply point wherein the operating of the component circuit is assured while also conserving a maximum amount of power.

Figure 3:
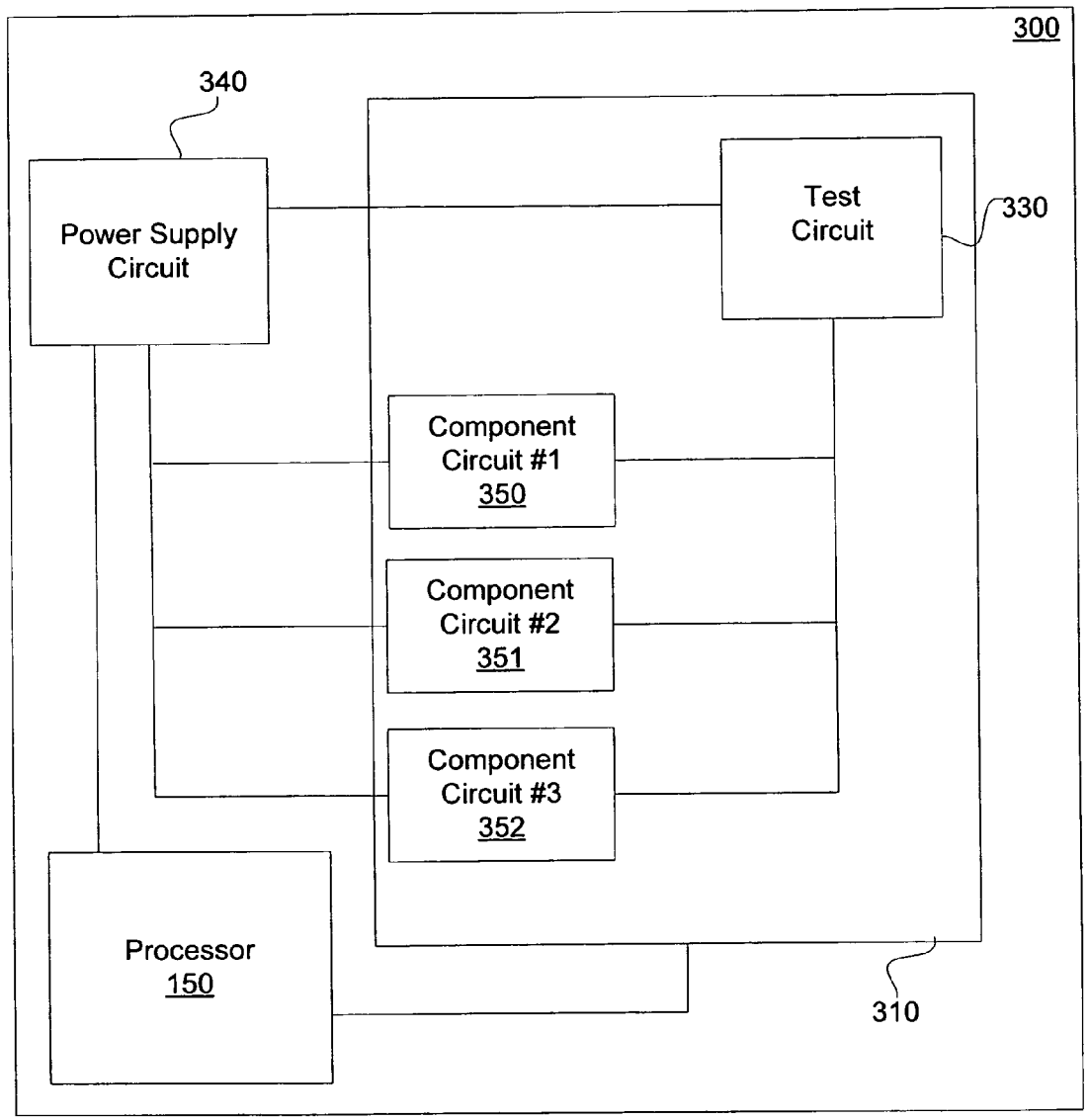
FIG. 3 is a functional block diagram generally illustrating an electronic device having power conservation capabilities for a plurality of electronic components according to an embodiment of the invention.

FIG. 3 is a functional block diagram generally illustrating an electronic device 300 having power conservation capabilities for a plurality of electronic components 351-353 according to an embodiment of the invention. In this embodiment, the test circuit 330 is coupled to a plurality of component circuits 351-353. The component circuits 351-353 may be circuits utilized by the system for performance of system functionality. For example, the component circuit 351 may be a digital imaging device, the component circuit 352 may be a ringtone generator, and the component circuit 353 may be a display device all of which have different non-linear power requirements. The test circuit 330 and the component circuits 351-353 may be part of an electronic circuit 310 that may comprise one or more integrated circuits.

In exemplary operation of the electronic device 300 having a multi-component circuit embodiment, the test circuit 330 may monitor and receive performance data from each component circuit 351-353. The electronic device 300 may further include a processor 150 for implementing programmatic instructions for realizing various power control scenarios at various operating conditions for the electronic circuit 310. The processor 350 is coupled to the power supply circuit 340 and to the electronic circuit 310 such that operational control of each may be implemented through computer-readable instructions stored in a volatile or non-volatile memory (not shown). Alternatively, the electronic device 300 may only include firmware (not shown) having a hard-set of executable instructions for realizing a power conservation scheme in the electronic device. In any case, the power supply circuit 340 is typically coupled to a control circuit (i.e., processor 350 or firmware) that may programmatically control the power supply circuit 340 and other component features of the electronic device 300.

The test circuit 330 typically comprises a testing circuit that implements self-test programming instructions to implement a power conservation scheme within electronic circuit 310. In the embodiment detailed in FIG. 3, test circuit 330 and component circuits 351-353 are implemented as separate, distinct circuits. In another embodiment (not shown), on or more of the component circuits 351-353 may be configured to include one or more test circuits 330.

As was described above with respect to the embodiment of FIG. 1, the executable instructions may implement a self test for realizing a power conservation scheme, which may be implemented on a component-by-component basis as method 200 (see FIG. 2, above) as described in the present invention. In exemplary operation, test circuit 330 may receive performance data from the first component circuit 351 and provide instructions to the first component circuit 351 based on the performance data and the self test programming instructions. Thus, the power supplied to the first component circuit 351 may be iteratively reduced until just above a power level for a minimum operating level of the first component circuit 351. This process may then be repeated for each remaining component circuit 352-353 in the electronic device 300 such that each component circuit 352-353 may be associated with a different minimum operating power level.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

We claim:

1. An electronic circuit, comprising:
   a first component circuit having a first minimum performance level associated therewith;
   a power supply coupled to the first component circuit, the power supply being configured to supply a first level of power to the first component circuit; and
   a test circuit operably coupled to the first component circuit and operably coupled to the power supply, the test circuit being configured to monitor and measure a first performance level associated with the first component circuit and to monitor the first level of power supplied to the first component circuit, the test circuit further being configured to control the power supply to iteratively reduce the first level of power supplied to the component circuit until the first minimum performance level is no longer met just below a first minimum power level, the test circuit further being configured then to restore the first minimum power level provided to the first component circuit.

2. The electronic circuit of claim 1 wherein at least one of the component circuit, the test circuit, and the power supply comprises an integrated circuit.

3. The electronic circuit of claim 1, wherein the component circuit comprises a component from the group comprising: a ringtone generator, an image sensor, a photocell, a control circuit, a processing circuit, a memory circuit, a display device, a lighting device, and a recording device.

4. The electronic circuit of claim 1, wherein the power supply comprises a plurality of current sources each operable to be controlled by the test circuit.

5. The electronic circuit of claim 4, wherein the plurality of current sources comprises current mirrors in a cascading configuration.

6. The electronic circuit of claim 1, further comprising at least a second component circuit operably coupled to the power supply and the test circuit, the second component circuit having a second minimum performance level associated therewith, such that the test circuit is further configured to monitor and measure a second performance level associated with the second component circuit and to monitor a second level of power supplied to the second component circuit, the test circuit further being configured to control the power supply to iteratively reduce the second level of power supplied to the second component circuit until the second minimum performance level is no longer met just below a second minimum power level, the test circuit further being configured then to restore the second minimum power level provided to the second component circuit.

7. The electronic circuit of claim 1, wherein the test circuit is further configured to monitor and measure the first component circuit to determine whether or not the first component circuit is operating at an optimal operating level.

8. The electronic circuit of claim 1, wherein the test circuit is configured to monitor an analog-to-digital converter in the first component circuit to determine the optimal operating level.

9. A method of conserving power in an electronic circuit, comprising:
   monitoring and measuring a first performance level of a first component circuit;
   determining whether the first performance level of the first component circuit is at or above a first minimum performance level associated with the first component circuit;
   if the first component circuit is operating at or above the first minimum performance level, iteratively reducing a first level of power supplied to the first component circuit until the first minimum performance level is no longer met just below a first minimum power level; and
   restoring the first minimum power level provided to the first component circuit.

10. The method of claim 9, wherein reducing the first level of power supplied to the first component circuit comprises reducing an amount of first current supplied to the first component circuit from the power supply.

11. The method of claim 9, wherein reducing the first level of power supplied to the first component circuit comprises reducing a first voltage supplied to the first component circuit from the power supply.

12. The method of claim 9, wherein monitoring and measuring the first performance level of the first component circuit further comprises monitoring and measuring an output of an analog-to-digital converter to determine the first minimum performance level corresponding thereto.

13. The method of claim 9 wherein monitoring and measuring the first performance level is prompted by an occurrence of an event.

14. The method of claim 13, wherein the event comprises an event selected from the group consisting of: a power-up event, a ringtone event, a self-test event, a mode switch event, a low battery event, and a timing event.

15. The method of claim 9, wherein monitoring and measuring the first performance level is prompted by anticipation of an event.

16. An electronic system, comprising:
   a plurality of component circuits, each component circuit having a minimum performance level associated therewith;
   a power supply operably coupled to each component circuit, the power supply being configured to supply power to each component circuit; and
   a test circuit operably coupled to each component circuit and coupled to the power supply, the test circuit being configured to monitor and measure a performance level associated with each component circuit and to monitor the power supplied to each component circuit, the test circuit further being configured to control the power supply to iteratively reduce the amount of power supplied to each component circuit until the minimum performance level associated with each such component circuit is no longer met just below a minimum power level associated with each such component circuit, the test circuit further being configured then to restore the amount of power provided to each such component circuit to the minimum power level associated therewith.

17. The electronic system of claim 16, wherein the test circuit is further configured to reduce iteratively the amount of power supplied to each component circuit individually until each component circuit has the minimum power level associated therewith.

18. The electronic system of claim 17, further comprising a processor for controlling the test circuit, the power supply and each component circuit, the processor having stored therein computer-executable instructions for implementing a power conservation scheme associated therewith.

* * * * *